No. 668,767. Patented Feb. 26, 1901.
H. BIRD.
PROPAGATING POT.
(Application filed Mar. 19, 1900.)
(No Model.)

WITNESSES:
Henry Krug
Russell M. Everett

INVENTOR
Henry Bird,
BY
Drake &G.
ATTORNEYS

UNITED STATES PATENT OFFICE.

HENRY BIRD, OF NEWARK, NEW JERSEY.

PROPAGATING-POT.

SPECIFICATION forming part of Letters Patent No. 668,767, dated February 26, 1901.

Application filed March 19, 1900. Serial No. 9,151. (No model.)

*To all whom it may concern:*

Be it known that I, HENRY BIRD, a citizen of the United States, residing at Newark, in the county of Essex and State of New Jersey, have invented certain new and useful Improvements in Pots for Propagating Seed, Slips, &c., of Plants; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to secure a more gradual and uniform supply of water to the earth or soil of a propagating pot or vessel, whereby the seeds, and especially fine delicate seeds or spores, and the young plants springing up therefrom are prevented from unduly damping, and thus being injured; to enable the water to be supplied without pouring upon the top of the soil and by impact hardening the surface, and thus rendering the relation of the soil to the seed inimical to a proper germination or propagation, and, furthermore, to prevent the seed from becoming unduly covered by the soil and from being carried by the water into the interstices or depressions in the surface of the soil, whereby the regularity of disposition of the young plants will be destroyed, and to enable a series of pots to be continuously and evenly supplied with water from a single reservoir; to enable the pots having outside peripheral water-supply grooves to be "nested" without danger of breaking through the outside walls of said grooves, and to secure other advantages and results, some of which may be referred to hereinafter in connection with the description of the working parts.

The invention consists in the improved pot or pan for propagating seeds, cuttings, and the like and in the arrangements and combinations of parts of the same, all substantially as will be hereinafter set forth, and finally embraced in the clauses of the claim.

Figure 1:
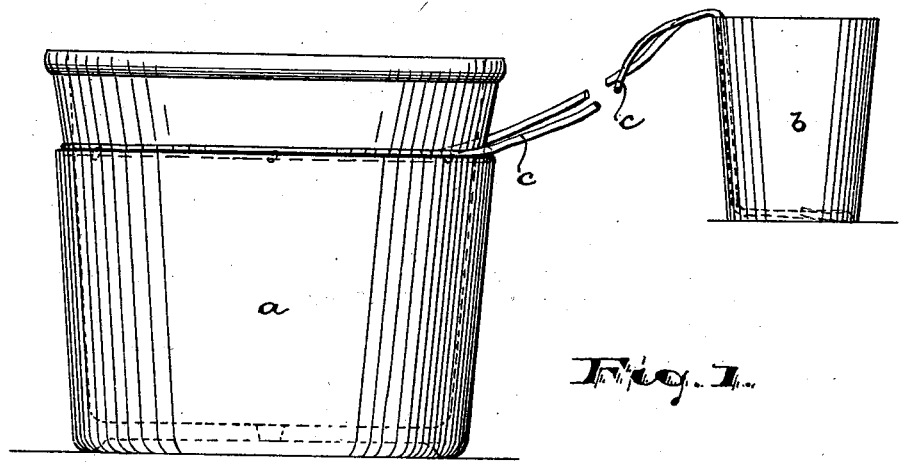
Figure 2:
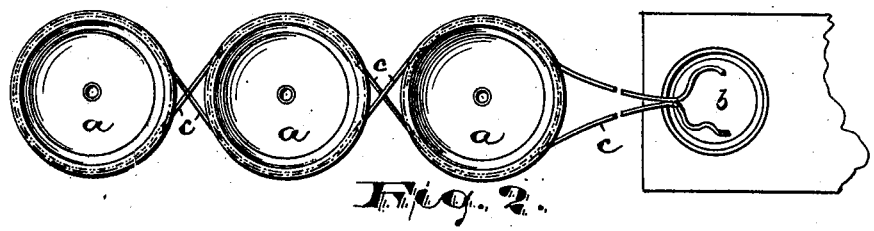
Figure 3:
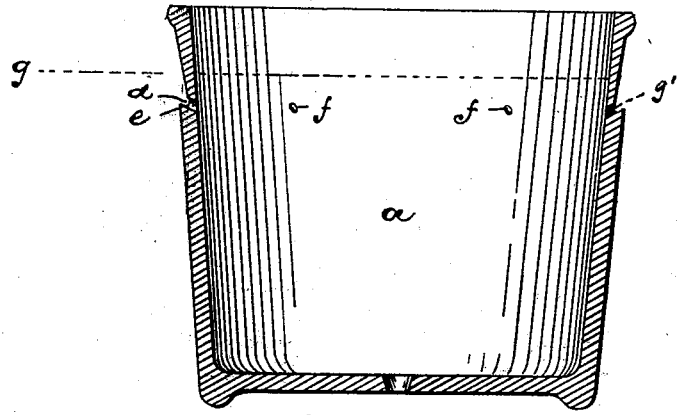

Referring to the accompanying drawings, in which like letters of reference indicate corresponding parts in each of the several views, Figure 1 is a front elevation of the improved pot and connections. Fig. 2 is a plan showing a series of said pots in connection with a reservoir for water, and Fig. 3 is a section taken through the vertical axis of the pot.

In said drawings, $a$ indicates the porous pot or pan, of ordinary clay or earthenware, $b$ a reservoir for water, and $c$ a capillary connection between said reservoir and pot, through or over which the water is conveyed from the said reservoir $b$ to said pot or pots $a$ by capillary attraction or force. The said reservoir $b$ may be of any convenient construction and capacity suitable for holding an ample supply of water. The capillary connection $c$ is preferably a woolen string or yarn, by means of which by capillary attraction the water is siphoned out from the receptacle or reservoir $b$ to the pot or pots $a$. In the preferred construction of the pot, by which the water thus drawn from the reservoir is evenly distributed to the soil within said pot or pots, the outside of the pot is provided with a peripheral groove $d$, disposed at a point an inch, more or less, from the upper edge of the pot, the mouth of which groove opens upward, so as to receive the yarn or string, a guard-rib $e$ being formed at the outer side of the groove, by means of which the said cord will be held against the pot at the desired elevation and all possibility of displacement or dropping will be positively prevented. The said guard-rib $e$ does not project beyond the approximately vertical surface lines of the body $a'$ of the pot, as clearly shown in Figs. 1 and 3, so that there will be no inward pressure upon the rib $e$ when two or several of the pots are nested, and a possibility of breakage of the rib, so that the water will be allowed to flow down the sides of the pot rather than through the perforations $f$ to the interior, is avoided. The groove and rib being formed as described, there is no danger of breakage of the latter when the pots are arranged side by side on the propagating-bench, the rib $e$ in this event being protected by the heavy laterally-projecting bead or border extending out from the top of the pot beyond the vertical line of the rib, as will be understood. Extending inward from the bottom of said groove are a series of water passages or perforations $f f f$, which perforations are also disposed at a point below the usual ground-line, (represented by the line $g$,) so that the water is fed beneath the upper surface, upon which the seed, spores, or plant-germs lie. The water thus supplied to the soil is fed very gradually and continually in a very small quantity, and thus there is no danger that the surface of the soil or ground will be packed or the seeds washed into the lower cavities of the surface, and thus because of the continual and even watering the seeds find the best conditions for germination.

I prefer to employ in connection with the water-reservoir $b$ a series of pots $a\,a\,a$, which are connected, as indicated in Fig. 2, the capillary cord $c$ extending around the pots and from one pot to another and crossing between said pots in the manner illustrated or in any other suitable manner. The water transmitted by the cord flows from the outside groove through the perforations, and should the flow to the first pot or pan be too copious the supply may be reduced by employing plugs to a part of the perforations of the series. These perforations may be entered from the outside of the pot, as indicated in Fig. 3 at $g'$. To cut off the supply temporarily, as occasion may require, the connection is separable both from the reservoir and from the pots.

Having thus described the invention, what I claim as new is—

1. The improved flower pot or pan herein described, comprising a pot or pan having an outside peripheral groove walled at the outside by a rib $e$, which does not project beyond the vertical line of the upper edge of the pot, said pot being perforated and the perforations extending inward from said groove, substantially as set forth.

2. The improved flower-pot having a peripheral groove on the outside at a point near but below the laterally-projecting upper border of the pot, the rib $e$, forming the outside wall of the groove lying within the approximately vertical lines of the body of the pot, substantially as set forth.

3. The combination with the pot having an outside groove, of a capillary cord arranged around said pot in said groove and extending to a water-supply, substantially as set forth.

4. The combination with the pot having an outside groove opening upward and perforations leading into the pot from said groove, of a cord arranged in said groove and extending to a supply of water, and adapted to conduct the water to said groove by capillary attraction, substantially as set forth.

In testimony that I claim the foregoing I have hereunto set my hand this 12th day of March, 1900.

HENRY BIRD.

Witnesses:
CHARLES H. PELL,
C. B. PITNEY.